United States Patent
Otsuki et al.

(10) Patent No.: US 6,920,363 B2
(45) Date of Patent: Jul. 19, 2005

(54) ACCELERATION AND DECELERATION CONTROL METHOD

(75) Inventors: Toshiaki Otsuki, Hino (JP); Shouichi Sagara, Yamanashi (JP); Kazuhiko Sonobe, Hachioji (JP)

(73) Assignee: Fanuc LTD, Yamanashi (JP)

(*) Notice: Subject to any disclaimer, the term of this patent is extended or adjusted under 35 U.S.C. 154(b) by 78 days.

(21) Appl. No.: 09/964,564

(22) Filed: Sep. 28, 2001

(65) Prior Publication Data

US 2002/0045957 A1 Apr. 18, 2002

(30) Foreign Application Priority Data

Oct. 18, 2000 (JP) ........................................ 2000-318293

(51) Int. Cl.$^7$ ............................................. G05B 19/18
(52) U.S. Cl. ............................... 700/63; 700/56; 700/61
(58) Field of Search ............................ 700/63, 61, 186, 700/188, 302, 69, 170, 187–189, 56; 318/568.13, 568.15, 573, 570

(56) References Cited

U.S. PATENT DOCUMENTS

| | | | | |
|---|---|---|---|---|
| 4,714,867 A | * | 12/1987 | Palmin et al. | 318/696 |
| 4,843,297 A | * | 6/1989 | Landino et al. | 318/811 |
| 5,331,264 A | * | 7/1994 | Cheng et al. | 318/568.11 |
| 5,485,065 A | * | 1/1996 | Kaneko et al. | 318/270 |
| 5,708,342 A | * | 1/1998 | Nihei et al. | 318/568.18 |
| 5,811,952 A | * | 9/1998 | Kato et al. | 318/568.11 |
| 5,955,856 A | * | 9/1999 | Sato et al. | 318/560 |
| 5,963,003 A | * | 10/1999 | Boyer | 318/574 |
| 6,278,253 B1 | * | 8/2001 | Hong | 318/568.13 |
| 6,408,216 B1 | * | 6/2002 | Adachi | 700/63 |

FOREIGN PATENT DOCUMENTS

| | | |
|---|---|---|
| JP | 04-362710 | 12/1992 |
| JP | 11-053021 | 2/1999 |
| JP | 11-202925 | 7/1999 |
| WO | WO99/08167 | 2/1999 |

OTHER PUBLICATIONS

Patent Abstracts of Japan for Publication No. 04362710 dated Dec. 15, 1992.

* cited by examiner

*Primary Examiner*—Anthony Knight
*Assistant Examiner*—Ronald D Hartman, Jr.
(74) *Attorney, Agent, or Firm*—Staas & Halsey LLP

(57) ABSTRACT

An acceleration and deceleration control in which, for a relation between speed and acceleration, the low speed part need not be symmetrical with the high speed part, is performed such that an actual acceleration curve may lie along a restricted acceleration curve as much as possible. A curve representing actual acceleration-speed, corresponding to time-speed transition to be planned, approaches a restricted acceleration curve. When supplying a movement command which has been subjected to acceleration and deceleration processing to a servo control section, acceleration in the acceleration and deceleration processing is determined such that a speed-acceleration curve of the movement command which has been subjected to acceleration and deceleration processing may lie along predetermined speed-acceleration curve. The speed-acceleration curve is set for each axis and dependent on acceleration or deceleration, using parameters.

6 Claims, 12 Drawing Sheets

FIG. 6

| SPEED | ACCELERATION | | | |
|---|---|---|---|---|
| | IN ACCELERATION | | IN DECELERATION | |
| | MOVEMENT IN POSITIVE DIRECTION | MOVEMENT IN NEGATIVE DIRECTION | MOVEMENT IN POSITIVE DIRECTION | MOVEMENT IN NEGATIVE DIRECTION |
| 0m/min | 8m/sec$^2$ | 9m/sec$^2$ | 12m/sec$^2$ | 11m/sec$^2$ |
| 10m/min | 7m/sec$^2$ | 9m/sec$^2$ | 12m/sec$^2$ | 10m/sec$^2$ |
| 20m/min | 6m/sec$^2$ | 8m/sec$^2$ | 11m/sec$^2$ | 9m/sec$^2$ |
| 30m/min | 5m/sec$^2$ | 7m/sec$^2$ | 9m/sec$^2$ | 8m/sec$^2$ |
| 40m/min | 4m/sec$^2$ | 6m/sec$^2$ | 8m/sec$^2$ | 6m/sec$^2$ |
| 50m/min | 1m/sec$^2$ | 3m/sec$^2$ | 4m/sec$^2$ | 2m/sec$^2$ | ated acceleration curve, even though, for the actual acceleration curve, the low speed part is symmetrical with respect to the high speed part (See Japanese Patent Application Laid-open No. 4-362710, for instance).

ACCELERATION AND DECELERATION CONTROL METHOD

BACKGROUND OF THE INVENTION

1. Field of the Invention

This invention relates to an acceleration and deceleration control method executed by a controller (a numerical control device) which controls automatic machines such as various working machines, and more specifically, to an acceleration and deceleration control method suitably applied to automatic machines such as working machines available for high-speed positioning.

2. Description of the Prior Art

It is well known that an acceleration and deceleration control is performed along with positioning when performing servo control of an automatic machine such as a working machine with a numerical control device. For acceleration and deceleration control in positioning, a name suited to the pattern of a graph showing a time-speed transition is given, so that acceleration and deceleration control of a linear pattern, a bell pattern or the like is well known heretofore. For acceleration and deceleration control of a bell pattern, the left-side graph of FIG. 2 shows a time-speed transition, while the right-side graph acceleration) and speed. A restricted acceleration curve is also shown in the right-side graph.

The restricted acceleration curve illustrates an acceleration which can be outputted, determined based on machine friction, gravity, motor output torque performance and the like, as a function of speed. As shown in FIG. 2, actual acceleration (acceleration to be actually outputted) in acceleration and deceleration control varies within the interior range of the restricted acceleration curve, since the acceleration and deceleration control is performed within the foregoing range.

One of the features of the acceleration and deceleration control in the prior art as represented by the above control of the bell pattern is that, for the relation between speed and acceleration, the low speed part is symmetrical with respect to the high-speed part. That is, a curve representing the relation between speed and actual acceleration is trapezoidal in shape. On the other hand, in a machine such as a working machine having axes subjected to acceleration and deceleration control, it is usual that, for an acceleration and deceleration performance which can be outputted, the low speed part is not symmetrical with the high speed part due to friction and gravity acting on the machine parts or due to the torque characteristics of a motor which drives an axis.

Accordingly, a restricted acceleration curve, which is a function of a speed and represents an acceleration and deceleration performance which can be outputted, is generally provided in the shape of asymmetry with respect to speed. A typical restricted acceleration curve (which is shown in FIG. 2 along with the acceleration-speed curve) is shown in FIG. 5 with a horizontal axis denoted as speed and a vertical axis as acceleration.

As is apparent from the shape of the curve in FIG. 5, an acceleration and deceleration performance which can be outputted is restricted particularly in the high-speed part. For this reason, in the prior art, there is provided a method for realizing sufficient acceleration and deceleration control as much as possible within the range of the restricted acceleration curve by generating an actual acceleration curve a part of which comes into contact with the restricted acceleration curve, even though, for the actual acceleration curve, the low speed part is symmetrical with respect to the high speed part (See Japanese Patent Application Laid-open No. 4-362710, for instance).

However, as the acceleration and deceleration performance according to the above method is also restricted by the high-speed part of the restricted acceleration curve, full acceleration meeting the performance cannot be realized in the low-speed part. In other words, a most part of the acceleration performance is not effectively utilized in the low speed part, with the result that it takes extra time for positioning and acceleration and deceleration before and after the positioning.

OBJECT AND SUMMARY OF THE INVENTION

It is an object of the present invention to provide a method for acceleration and deceleration control which can reduce a time required for acceleration and deceleration associated with positioning performed by a controller for controlling an automatic machine such as a working machine, enabling high speed positioning and highly efficient work such as machining.

To attain the above object, in the present invention, a condition that, for the relation between speed and acceleration, the low speed part be symmetrical with respect to the high speed part is eliminated, and acceleration and deceleration control is performed in which an actual acceleration curve lies along a restricted acceleration curve as much as possible.

That is, according to the present invention, there is provided a method for acceleration and deceleration control for supplying a movement command which has been subjected to acceleration and deceleration processing to a servo control section, wherein acceleration in the above acceleration and deceleration processing is determined such that a speed-acceleration curve of the above movement command which has been subjected to acceleration and deceleration processing may lie along a predetermined speed-acceleration curve, and the above speed-acceleration curve is set for each axis and dependent on acceleration or deceleration. Here, the speed-acceleration curve is set such that it agrees with or is approximate to the restricted acceleration curve. However, it is to be understood that speed should be set not to exceed the restricted acceleration, as a matter of course.

The speed-acceleration curve may also be set for each direction of movement. In acceleration, an acceleration in the above acceleration and deceleration processing may be obtained so that it lies along the speed-acceleration curve, while, in deceleration, the processing is done with a fixed acceleration.

Further, in acceleration, an acceleration in the above acceleration and deceleration processing may be obtained so that it lies along the above speed-acceleration curve, while, in deceleration, the process may be done through filtering for a certain period of time with respect to the fixed acceleration.

Since the characteristics of acceleration may vary for each axis, for each direction of movement, dependent on acceleration or deceleration and the like in some cases, it is preferable that the restricted acceleration curve is provided for each axis, for each direction of movement, for either of acceleration or deceleration.

Incidentally, the relation between speed and acceleration which corresponds to the restricted acceleration curve may be set using parameters or the like in advance. For instance, the above relation between speed and acceleration may be provided in the shape of a polygonal line connecting points which represent restricted accelerations corresponding to speeds set as parameters. In the case where characteristics of acceleration does not agree with that of deceleration for each axis and for each direction of movement, restricted acceleration curve may be set for each characteristics (an example thereof will be described later).

A numerical control device according to the present invention comprises (1) a memory for storing, for each control axis, the relation between individual speeds in acceleration and corresponding restricted accelerations and also the relation between individual speeds in deceleration and corresponding restricted decelerations, in the form of a table, (2) acceleration-deceleration determination means for determining as to whether or not an acceleration operation should be done, an operation of a command speed should be done or a deceleration operation should be done, for the axis, in the present processing cycle, (3) speed determination means for determining speeds in the present processing period (3-1) by using a speed in the present processing cycle as a command speed in the case where the acceleration-deceleration determination means decided that an operation of a command speed be applied, (3-2) by reading from the memory a restricted acceleration corresponding to the speed of the axis obtained in the previous processing cycle to determine a speed in the present processing cycle using the restricted acceleration thus read in the case where the acceleration-deceleration determination means decided that acceleration be applied, or (3-3) by reading from the memory a restricted deceleration corresponding to the speed of the axis obtained in the previous processing cycle to determine a speed in the present processing cycle using the restricted deceleration thus read in the case where the acceleration-deceleration determination means decided that deceleration be applied, and (4) output means for finding data on the amount of movement of the axis in the present processing cycle by using the speed found by the speed determining means, and then outputting the data on the amount of movement to a servo control system for the axis.

According to the present invention, it is possible to conduct acceleration and deceleration control adapted to machine characteristics due to machine friction and gravity and the motor torque, allowing to make a good use of the performance of a machine and a motor, so that high-speed positioning becomes possible, resulting in an increase in working efficiency.

BRIEF DESCRIPTION OF THE DRAWINGS

The foregoing and other objects and features of the invention will become apparent from the following description of embodiments of the invention with reference to the accompanying drawings, in which:

FIG. 6 is a numerical table illustrating set patterns of restricted acceleration curves;

DETAILED DESCRIPTION OF THE PREFERRED EMBODIMENTS

In the present invention, acceleration and deceleration is performed such that an actual acceleration curve lies along a restricted acceleration curve as much as possible, by performing acceleration and deceleration control in which, for a relation between speed and acceleration, the low speed part need not be symmetrical with the high speed part.

Figure 2:
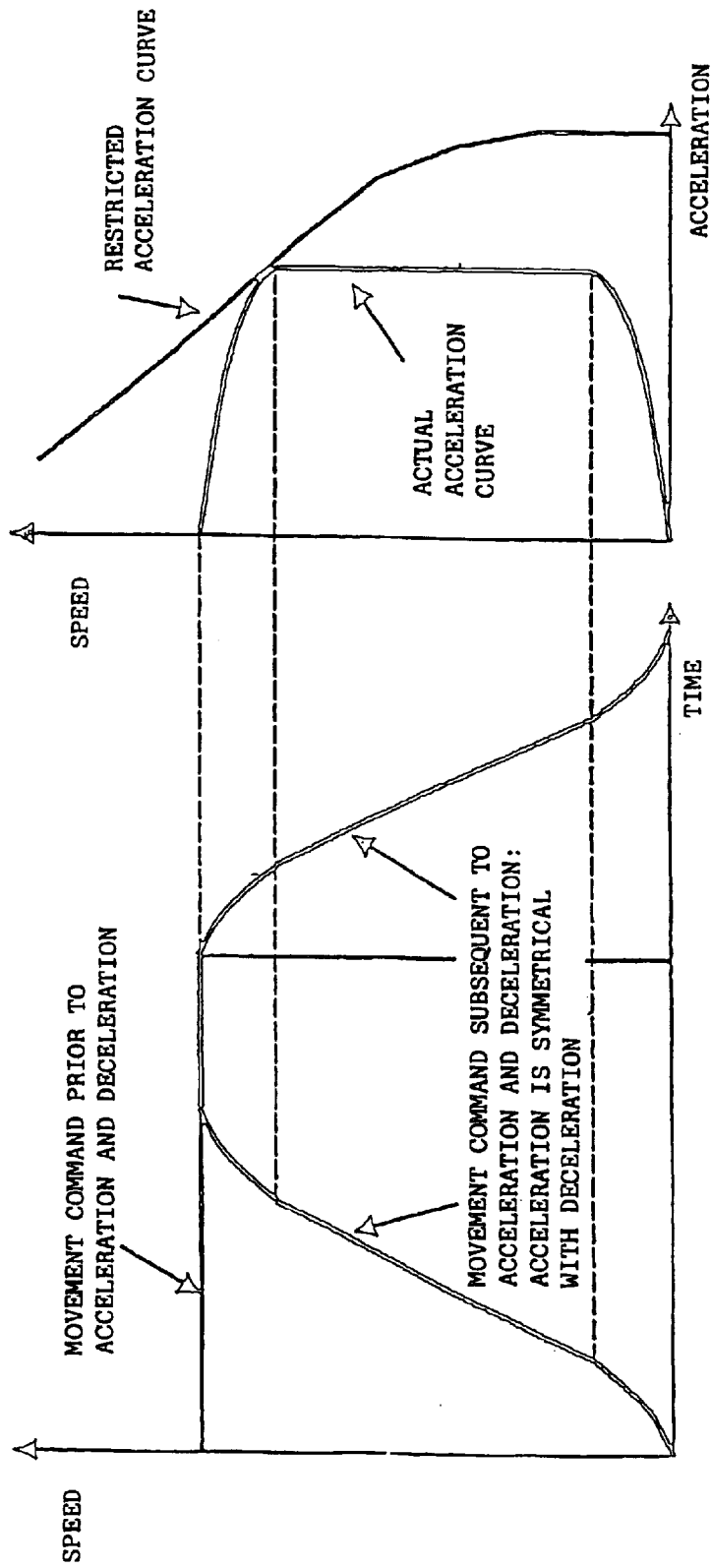
FIG. 2 is a diagram graphically illustrating acceleration and deceleration control for positioning according to the prior art.
Figure 3:
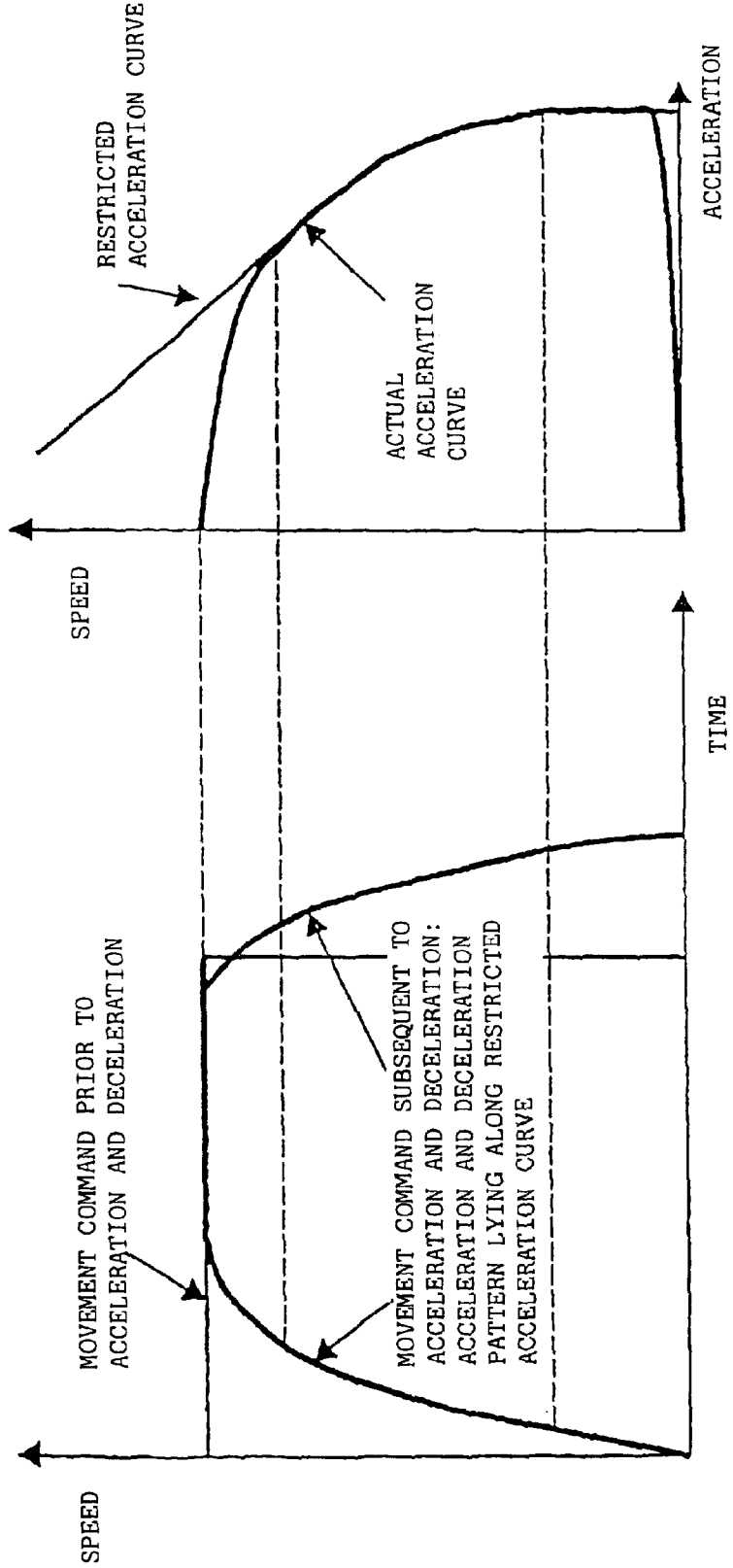
FIG. 3 is a diagram graphically illustrating acceleration and deceleration control for positioning, to which one embodiment according to the present invention is applied.

FIG. 3 is similar in illustration pattern to FIG. 2 described above, and shows a time-speed transition (shown in a left-side graph) and a relation between actual acceleration and speed (shown in a right-side graph) for acceleration and deceleration control adopted in one embodiment are shown. The right-side graph of FIG. 3 includes a restricted acceleration curve.

Since the characteristics of acceleration vary for each axis, for each direction of movement and dependent on acceleration or deceleration in some cases as described above, a restricted acceleration curve is set for each axis, for each direction of movement and for either acceleration or deceleration by using parameters. A description of a restricted acceleration curve for each condition will be given later.

Figure 1:
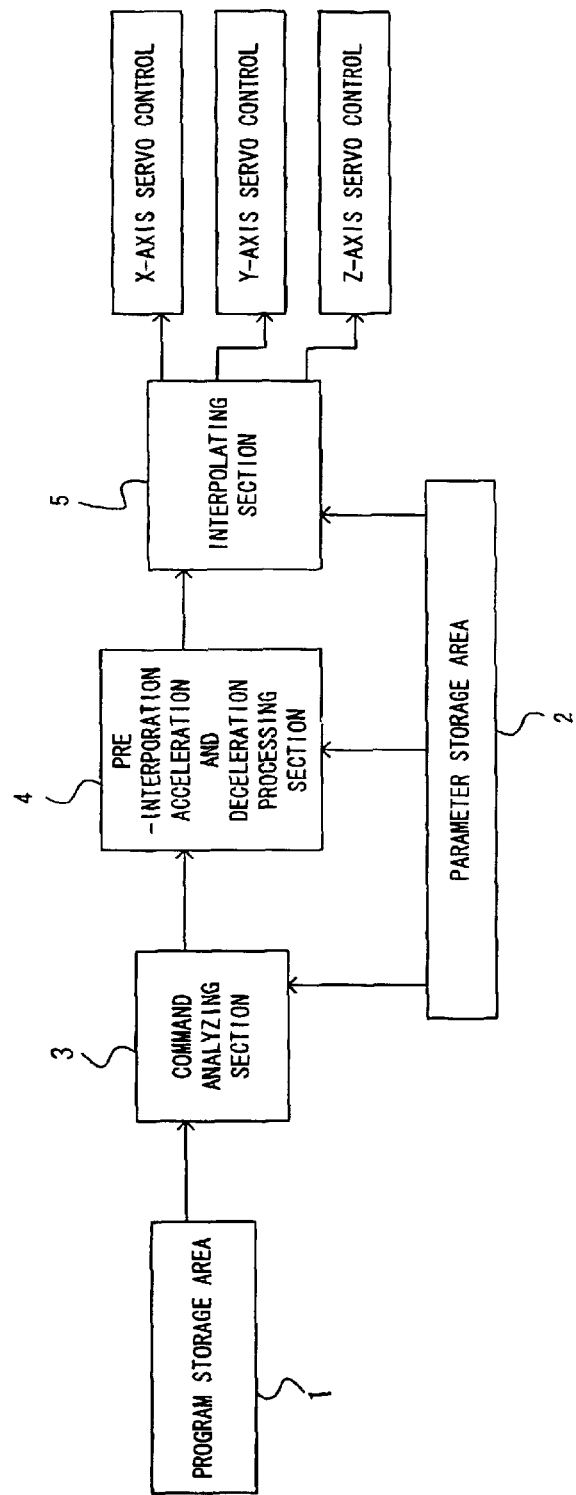
FIG. 1 is a block diagram showing an essential configuration of a numerical control device for carrying out a method according to the present invention.

FIG. 1 is a block diagram showing an essential part of a numerical control device for carrying out a method for acceleration and deceleration control according to the present invention. The numerical control device has a program storage area 1 for storing a part program and a parameter storage area 2 for determining various operating conditions. The parameters stored in the parameter storage area 2 include parameters for determining a restricted acceleration curve to comply with a different cases where a characteristics varies for each axis, for each direction of movement and dependent on acceleration or deceleration, as described above.

The numerical control device further has a command analyzing section 3, a pre-interpolation acceleration and deceleration processing section 4 and an interpolating section 5. Output from the interpolating section 5 is used for control of each axis, inclusive of acceleration and deceleration control associated with positioning. In the present embodiment, X-axis, Y-axis and Z-axis are controlled.

In execution of automatic operation, the numerical control device reads out part program data corresponding to the speed transition as shown in FIG. 3 from the program storage area 1 and then supplies the readout data to the command analyzing section 3. The command analyzing section 3 is a pre-processing section for generating data for interpolation from commands of an amount of movement and a feed speed for each command block. The preprocessed data is subjected to acceleration and deceleration processing in the pre-interpolation acceleration and deceleration processing section 4, and then is supplied to the interpolating section 5, where the preprocessed data is divided into movement commands for servomotors of the respective axes (i.e., X-axis, Y-axis, and Z-axis in this embodiment), and the movement commands are outputted to a servo control section.

A description will now be briefly given of the set patterns of restricted acceleration curves (the speed-acceleration curves) with reference to FIGS. 6 to 10.

FIG. 6 given in the form of a numerical table shows the set patterns of the restricted acceleration curves every 10 m/min in four conditions of "acceleration control in a positive direction", "acceleration control in a negative direction", "deceleration control in a positive direction" and "deceleration control in a negative direction".

If numerical data shown in FIG. 6 is supplied to the numerical control device (See FIG. 1) by manually operating an operation panel (not shown), for instance, the numerical control device outputs four kinds of smooth curves (restricted acceleration curves) correspondingly to these four conditions. Alternatively, the numerical control device may be also configured to output these curves according to an appropriate command issued after the start of automatic operation.

The restricted acceleration curves applied to "acceleration control in the positive direction", "acceleration control in the negative direction", "deceleration control in the positive direction" and "deceleration control in the negative direction are formed correspondingly to the set patterns in FIG. 6, as shown in FIGS. 7 to 10. Incidentally, although the embodiment related to setting and formation of four kinds of restricted acceleration curves is shown, it is to be understood that if a number of conditions to be classified generally increases, then a number of restricted acceleration curves to set and formed increases accordingly.

Figure 11A:
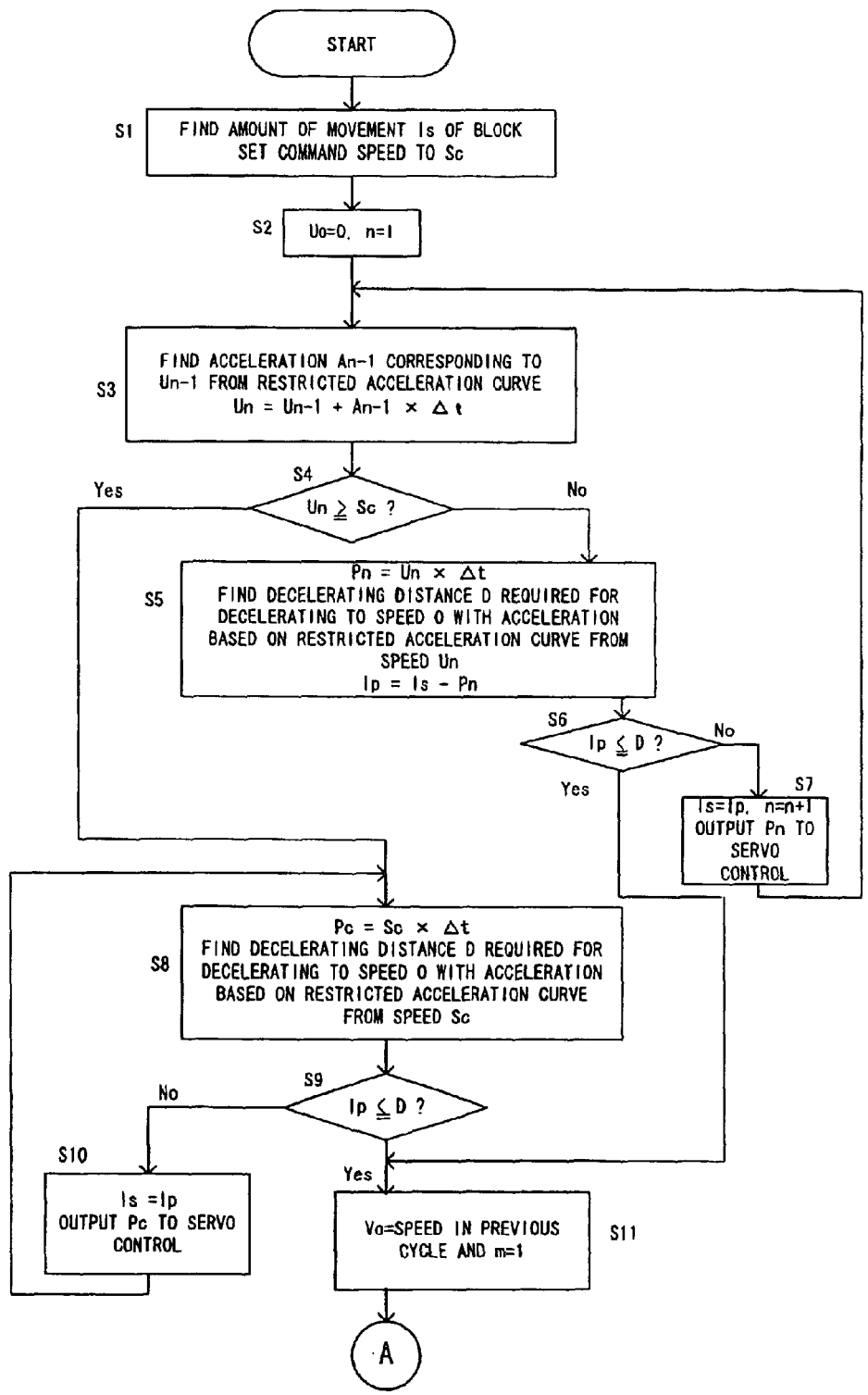
FIGS. 11A and 11B are flowcharts showing an outline of the execution of one embodiment according to the present invention.
Figure 11B:
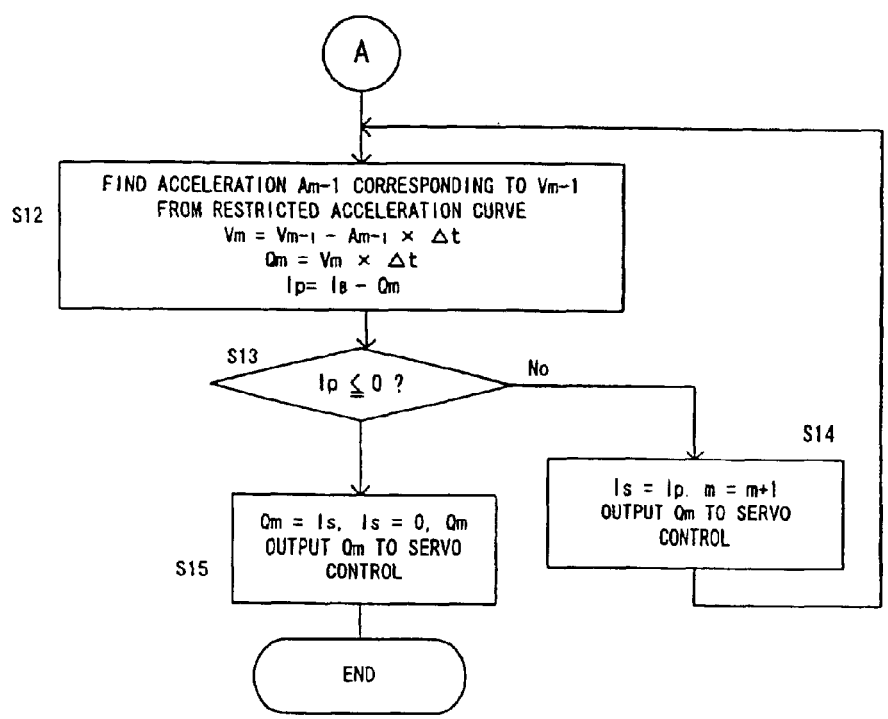

A description will now be given of the specific processing in a case where a program contains a positioning command and the positioning command is identified in the program analyzing section with reference to flowcharts shown in FIGS. 11A and 11B. For the convenience of explanation, it is assumed that a command on an axis is issued in this embodiment. If a command on a plurality of axes is issued, the similar processing on each axis is performed concurrently in synchronization with each other. Synchronization may be provided by concurrently executing output of data to the servo control system in a final step (Step S7, S14 or S16 in the flowchart) in a cycle of the processing, for instance.

Figure 4:
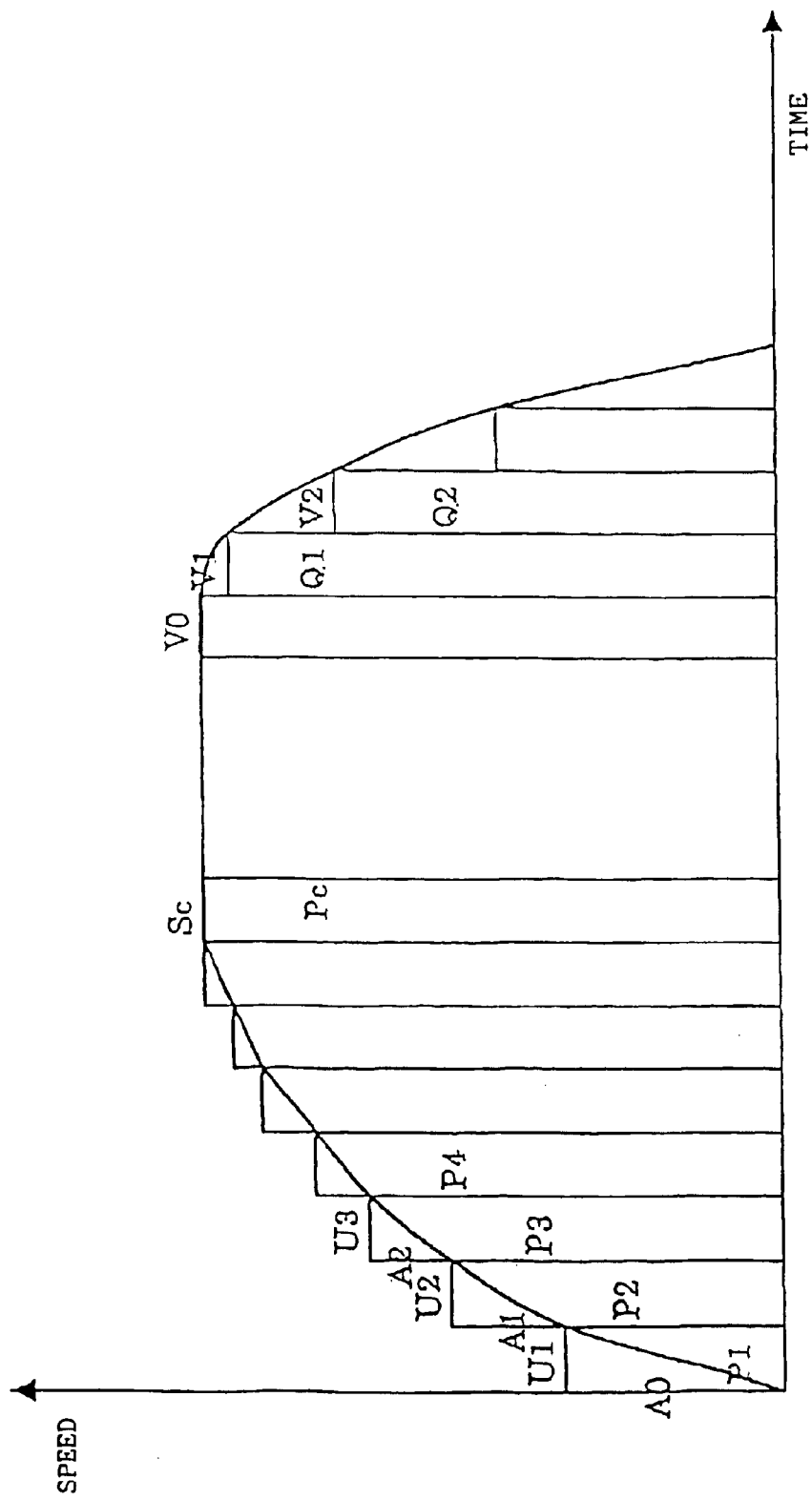
FIG. 4 is a diagram graphically showing acceleration, speed and output data required for one embodiment according to the present invention.
Figure 5:
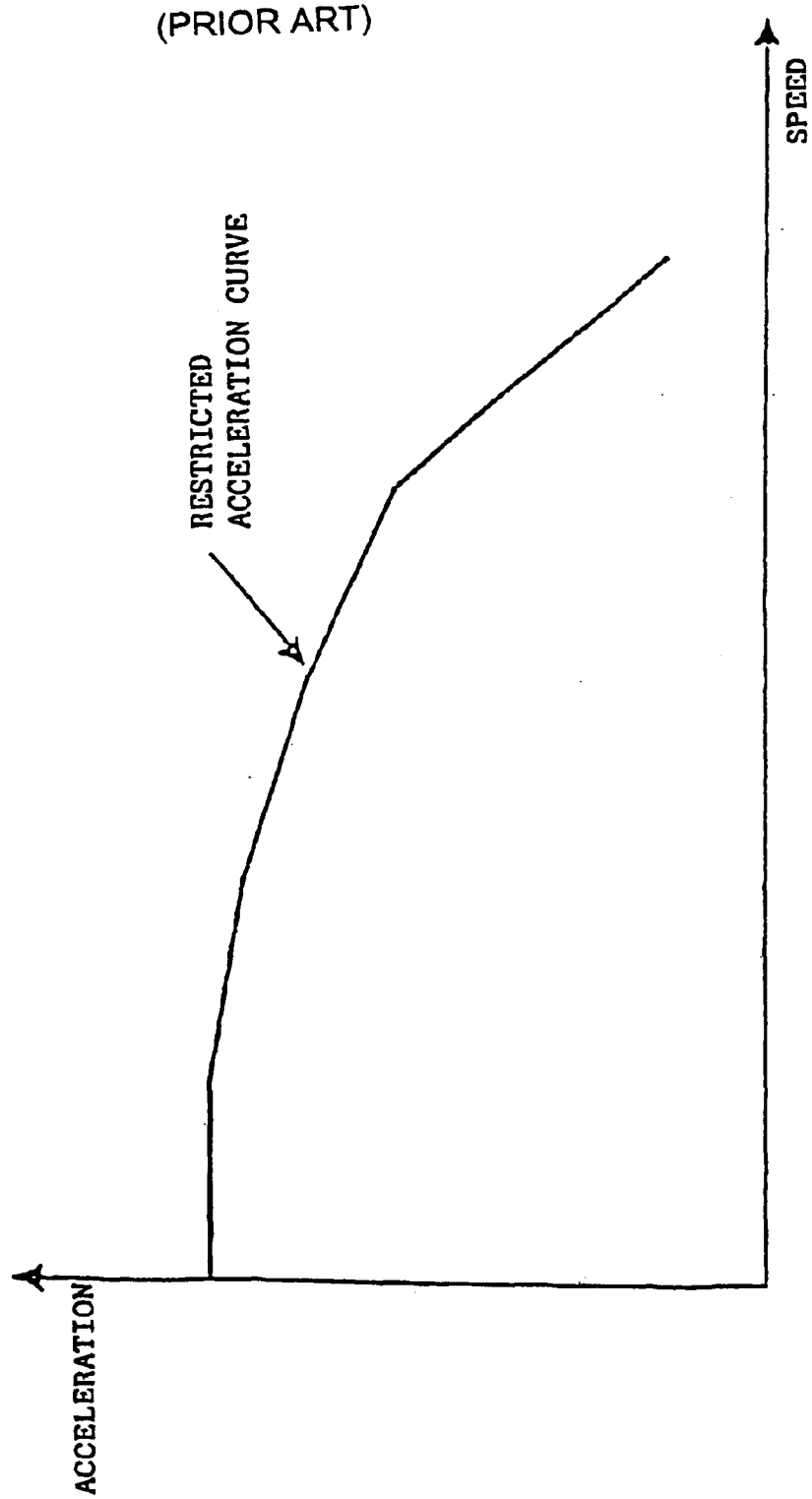
FIG. 5 is a diagram graphically illustrating the typical pattern of a speed-restricted acceleration curve.
Figure 7:
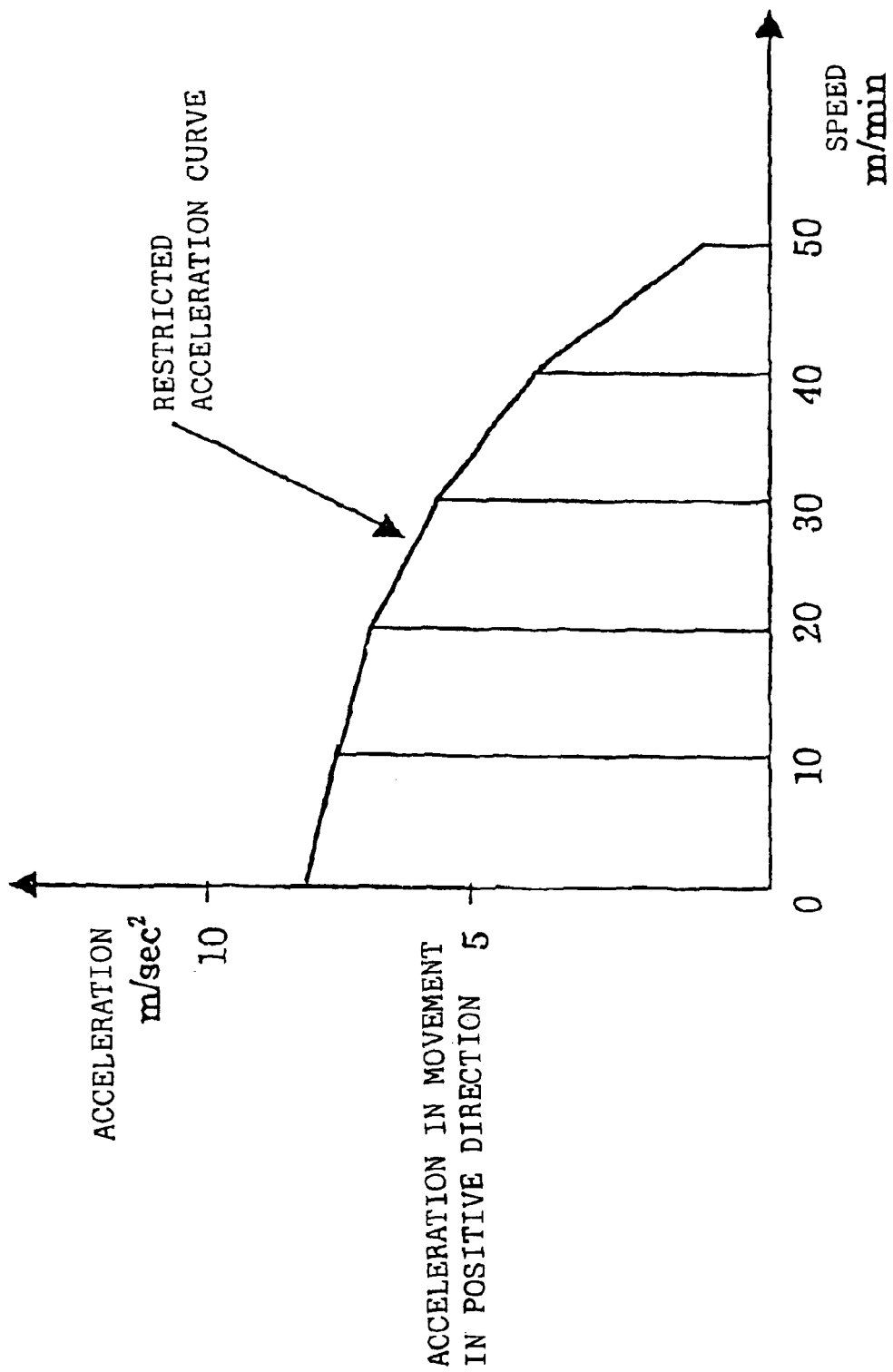
FIG. 7 is a diagram graphically illustrating one example of a restricted acceleration curve applied to "acceleration control in a positive direction", for the set pattern shown in FIG. 6.
Figure 8:
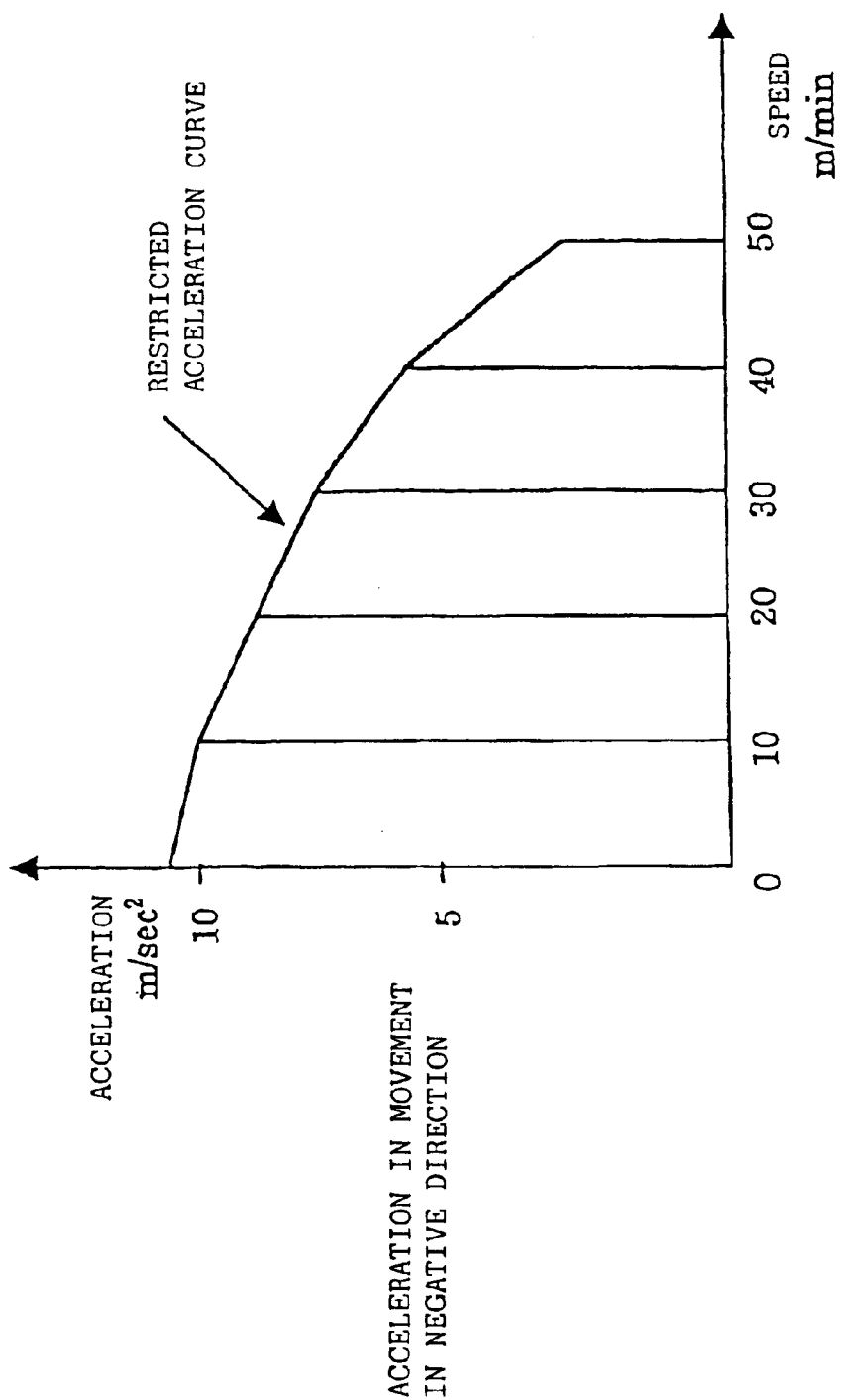
FIG. 8 is a diagram graphically illustrating a restricted acceleration curve applied to "acceleration control in a negative direction", for the set pattern shown in FIG. 6.
Figure 9:
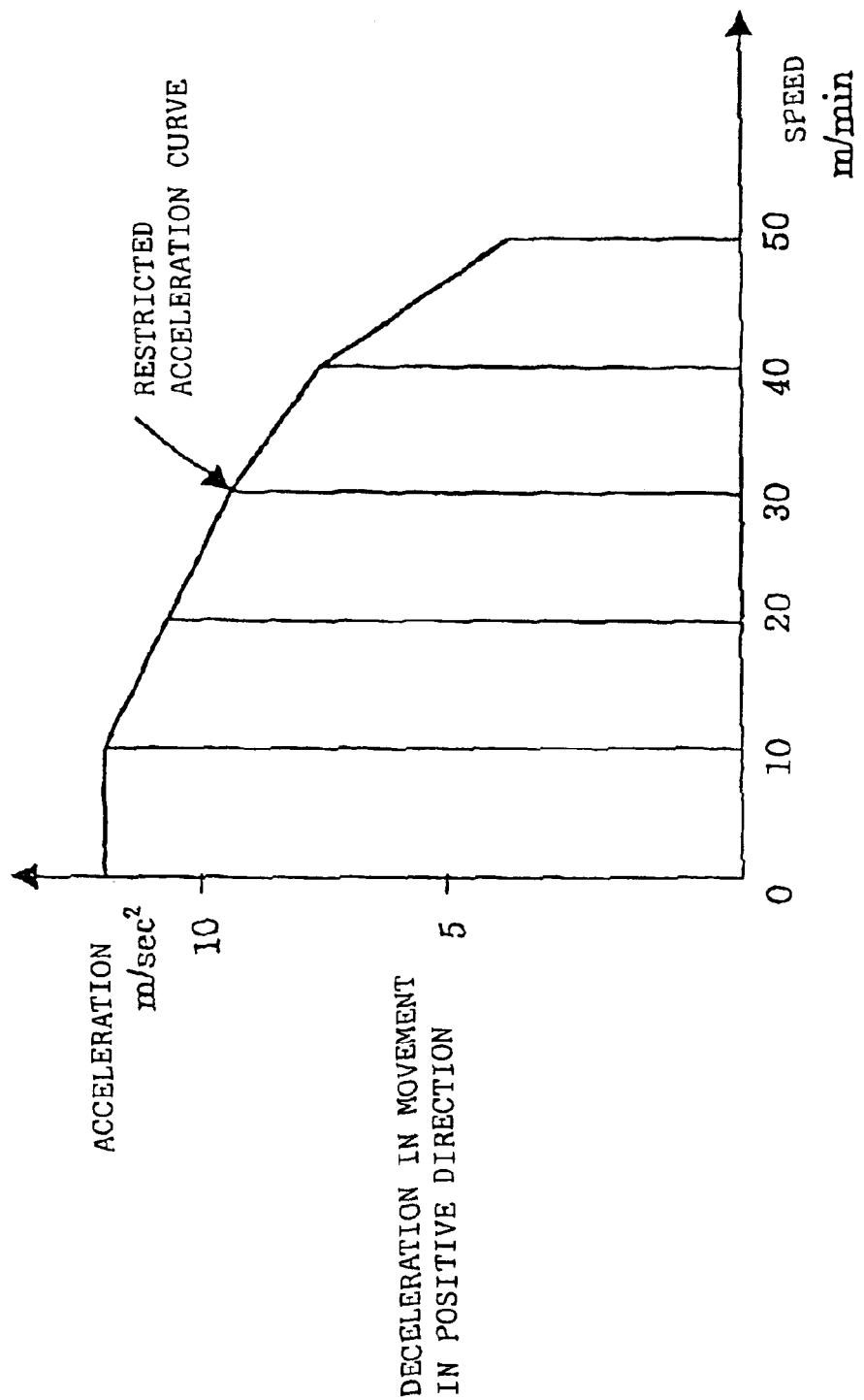
FIG. 9 is a diagram graphically illustrating a restricted acceleration curve applied to "deceleration control in a positive direction", for the set pattern shown in FIG. 6.
Figure 10:
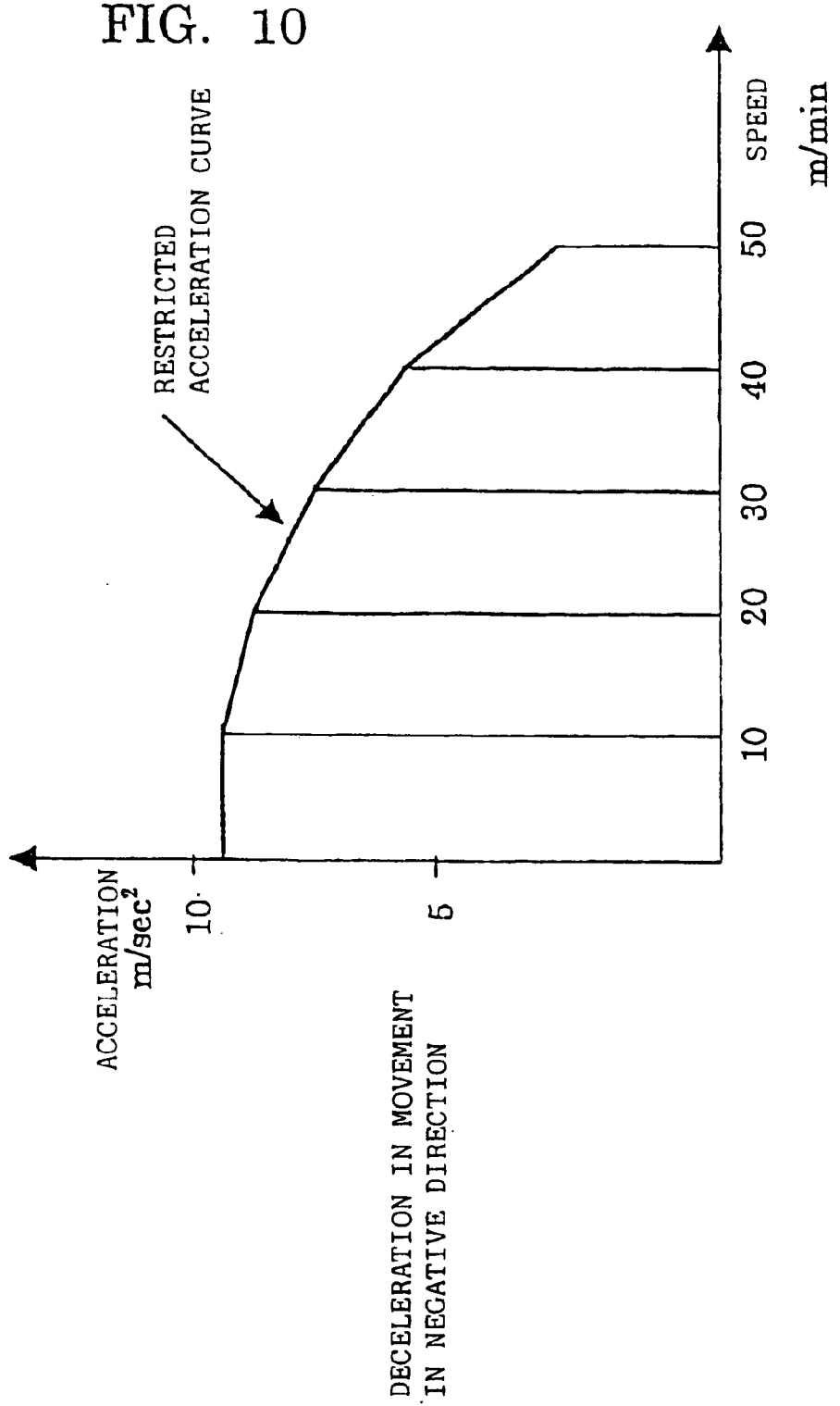
FIG. 10 is a diagram graphically illustrating a restricted acceleration curve applied to "deceleration control in a negative direction", for the set pattern shown in FIG. 6.

The acceleration, speed and output data are given as shown in FIG. 4. However, for the simplification of the drawing, a step function for approximating a time-speed transition curve is described more roughly than it really is. The outline of the procedure in the processing is as follows.

(1) An amount of movement Is in one command block (command speed Sc) of a program is found (Step S1). Subsequently, the pre-interpolation acceleration and deceleration processing and the interpolating processing are performed every certain period $\Delta t$ as follows.

(2) Acceleration control is started (Step S2). In this Step, speed U0 is set to zero (an initial value), and an index n in the progress of the processing is also set to 1 (an initial value), before the transition of the procedure to Step S3.

(3) In Step S3, the processing in the nth cycle since the start of acceleration control is started. In this Step, acceleration $A_{n-1}$ corresponding to speed $U_{n-1}$ found by the processing in the previous cycle is found from the restricted acceleration curve. Further, an operation of $U_n = U_{n-1} + A_{n-1} \times \Delta t$ is performed using speed $U_{n-1}$, acceleration $A_{n-1}$ and period $\Delta t$ to find speed $U_n$ in the present cycle (the nth cycle) of the processing.

(4) It is decided whether or not the found speed $U_n$ in the present cycle of the processing in Step S3 exceeds the command speed Sc (Step S4). If it exceeds, the transition of the procedure to Step S8 occurs. On the other hand, if it does not exceed, an operation of $P_n = U_n \times \Delta t$ is performed to find output data $P_n$ in the present cycle (the nth cycle) of the processing (Step S5). In this Step, a distance D required for deceleration to speed 0 with the acceleration based on the set restricted acceleration curve is calculated from the speed $U_n$. Further, an operation of $I_p = I_s - P_n$ is performed using the output data $P_n$ and the amount of movement Is updated in Step S7 described later (provided that a value found in Step S1 is used as Is for the processing in the first (n=1) cycle) to find an amount of movement $I_p$.

Subsequently, it is decided whether or not the relation between the amount of movement $I_p$ and the distance D both found in Step S5 satisfies an equation of $I_p \leq D$ (Step S6). If it satisfies, the transition of the procedure to Step S11 occurs. On the other hand, if it does not satisfy, the output data $P_n$ found in Step S5 is supplied to the servo control system, while the amount of movement $I_p$ found in Step S5 is replaced with Is, and the index n is incremented by 1 (n=n+1) (Step S7), before return of the procedure to Step S3 for starting the next cycle of the processing.

(5) When the transition of the procedure to Step S8 occurs according to the result of decision in Step S4, an operation of $P_c = S_c \times \Delta t$ is performed to find output data $P_c$ in the present cycle of the processing. Further, a distance D required for decelerating to the speed 0 with the acceleration based on the set restricted acceleration curve is calculated from the command speed Sc. Furthermore, an operation of $I_p = I_s - P_c$ is performed using the output data $P_c$ and the amount of movement Is updated in Step S7 described the above to find an amount of movement $I_p$.

Subsequently, it is decided whether or not the relation between the amount of movement $I_p$ and the distance D both found in Step S8 satisfies an equation of $I_p \leq D$ (Step S9). If it satisfies, the transition of the procedure to Step S11 occurs. On the other hand, if it does not satisfy, the amount of movement $I_p$ found in Step S8 is supplied to the servo control system, while the amount of movement $I_p$ is replaced with Is (Step S10), before return of the procedure to Step S8.

The above procedure from (3) to (5) is applied to the processing in the accelerating stage and its subsequent constant speed (Speed Sc) stage.

(6) Deceleration is started. The time when to start the deceleration control is judged according to the result of decision in Step S6 or S9. The speed in the cycle of the processing immediately before the start of deceleration control is set to V0. Further, an index m in the progress of the processing is set to 1 (an initial value) (Step S11), before the transition of the procedure to Step S12.

(7) In Step S12, the processing in the mth cycle since the start of deceleration control is started. In this Step, acceleration $A_{m-1}$ corresponding to speed $V_{m-1}$ found by the processing in the previous cycle (the m-1th cycle) is firstly found from the restricted acceleration curve.

Subsequently, found from the restricted acceleration curve. Subsequently, an operation of Vm=Vm−1−Am−1×Δt is performed using speed Vm−1, acceleration Am−1 and period Δt to find speed Vm in the present cycle (the mth cycle) of the processing. Further, an operation of Qm=Vm×Δt is performed using speed Vm and period Δt to find output data Qm in the present cycle (the mth cycle) of the processing. Furthermore, an operation of Ip=Is−Qm is performed using the output data Qm and the amount of movement Is updated in Step S14 described later (provided that a value updated in the previous Step S7 or S10 is used as Is for the processing in the first (m=1) cycle) to find the amount of movement Ip.

Subsequently, it is decided whether or not the amount of movement Ip found in Step S12 comes to a negative value (Step S13). If not negative, the transition of the procedure to Step S14 occurs. In Step S14, the output data Qm found in Step S12 is supplied to the servo control system, while the amount of movement Ip found in Step S12 is replaced with Is, and the index m is incremented by 1 (m=m+1) (Step S14), and the procedure returns to Step S12 for starting the next cycle of the processing.

On the other hand, if it is proved that the amount of movement Ip found in Step S12 is a negative value in the outputted as the output data Qm in the present cycle to the servo control system for terminating the processing of one block.

What is claimed is:

1. A method for acceleration and deceleration control for supplying a movement command during cycles of acceleration and deceleration processing to a servo control section controlling axial movement of axes, the method comprising:

determining accelerations by, for each cycle in said acceleration and deceleration processing, determining each acceleration in accordance with a speed obtained at a previous processing cycle, such that a speed-acceleration curve generated by movement commands which are made by the acceleration and deceleration processing will lie along a predetermined speed-acceleration curve, where the predetermined speed-acceleration curve is set for each axis, where said predetermined speed-acceleration curve has different acceleration magnitudes for a given speed magnitude depending on whether an axis is accelerating or decelerating, where the predetermined speed-acceleration curve is predetermined before the generated movement commands, and where for plural speeds of the speed-acceleration curve, corresponding plural accelerations, or corresponding plural decelerations, of the speed-acceleration curve are based on, or equal to, or approximations of corresponding plural accelerations, or decelerations, of the predetermined speed-acceleration curve of the corresponding axis.

2. The method for acceleration and deceleration control according to claim 1, wherein said speed-acceleration curve provides a different acceleration magnitude for each direction of movement.

3. A method according to claim 1, wherein the speed acceleration curve is a curve of maximum accelerations for the axis based on a torque output for its motor, based on machine friction, and based on gravity.

4. A numerical control device, comprising:

a memory for storing, for control axes, individual speeds in acceleration and corresponding predetermined restricted accelerations end also storing individual speeds in deceleration and corresponding predetermined restricted decelerations, in the form of a predetermined table;

acceleration-deceleration determination means for determining as to whether or not an acceleration operation should be applied, an operation of a command speed should be applied or a deceleration operation should be applied, for an axis, in a present processing cycle:

speed determination means for determining speeds in the present processing cycle, by using a speed in the present processing cycle as a command speed where said acceleration-deceleration determination means decided that an operation of a command speed be applied, by reading from said memory a predetermined restricted acceleration corresponding to the speed of said axis obtained in the previous processing cycle to determine a speed in the present processing cycle using said predetermined restricted acceleration where said acceleration-deceleration determination means decided that acceleration be applied, or by reading from said memory a restricted deceleration corresponding to the speed of said axis obtained in the previous processing cycle to determine a speed in the present processing cycle using said restricted deceleration where said acceleration-deceleration determination means decided that deceleration be applied; and output means for finding data on an amount of movement of said axis in the present processing cycle by using the speed found by said speed determination means, and then outputting said data on the amount of movement to a servo control system for said axis.

5. A method for implementing a movement instruction of an axis, comprising:

providing a speed-to-acceleration mapping that maps speed values to acceleration values based on a direction of movement; and over a sequence of movement cycles for performing the movement instruction during acceleration or deceleration, determining a given movement for a cycle by using the speed-to-acceleration mapping to map a speed of a previous cycle to an acceleration value and using the acceleration value for the given movement cycle, where accelerations of at least a segment of the speed-to-acceleration mapping coincide with, or approximate, or are based on accelerations of a corresponding segment of an actual physical speed-acceleration mapping of the axis.

6. A method for acceleration/deceleration control for supplying a movement command which has been subjected to cycles of acceleration/deceleration processing to a servo control section controlling axial movement of axes, the method comprising:

determining accelerations/decelerations for the movement command by, for each cycle in said acceleration/deceleration processing, determining each acceleration/deceleration in accordance with a speed of a previous processing cycle end in accordance with a predetermined speed-acceleration curve, where the predetermined speed-acceleration curve is set for each axis, where the predetermined speed-acceleration curve is predetermined before the determining of the accelerations/decelerations, and where at least a segment of the speed-acceleration curve is equal to, or approximates, or is based on a corresponding segment of an acceleration-restriction curve of the axis being moved.

* * * * *

UNITED STATES PATENT AND TRADEMARK OFFICE
CERTIFICATE OF CORRECTION

PATENT NO. : 6,920,363 B2
DATED : July 19, 2005
INVENTOR(S) : Toshiaki Otsuki et al.

It is certified that error appears in the above-identified patent and that said Letters Patent is hereby corrected as shown below:

Column 7,
Line 64, change "end" to -- and -.

Column 8,
Line 56, change "end" to -- and --.

Signed and Sealed this

Twenty-eighth Day of March, 2006

JON W. DUDAS
*Director of the United States Patent and Trademark Office*